(12) United States Patent
Belmont et al.

(10) Patent No.: US 8,574,537 B2
(45) Date of Patent: *Nov. 5, 2013

(54) LOW STRUCTURE CARBON BLACK AND METHOD OF MAKING SAME

(75) Inventors: James A. Belmont, Acton, MA (US); Geoffrey D. Moeser, Reading, MA (US); Andriy Korchev, Billerica, MA (US); Agathagelos Kyrlidis, Malden, MA (US); Jeremy K. Huffman, Amarillo, TX (US)

(73) Assignee: Cabot Corporation, Boston, MA (US)

( * ) Notice: Subject to any disclaimer, the term of this patent is extended or adjusted under 35 U.S.C. 154(b) by 494 days.

This patent is subject to a terminal disclaimer.

(21) Appl. No.: 12/148,870

(22) Filed: Apr. 23, 2008

(65) Prior Publication Data

US 2008/0292533 A1 Nov. 27, 2008

Related U.S. Application Data

(60) Provisional application No. 60/926,003, filed on Apr. 24, 2007, provisional application No. 60/963,815, filed on Aug. 7, 2007.

(51) Int. Cl.
| | |
|---|---|
| *C01D 3/00* | (2006.01) |
| *C01B 31/02* | (2006.01) |
| *C09C 1/48* | (2006.01) |
| *B41M 5/165* | (2006.01) |
| *C09C 1/44* | (2006.01) |
| *C08L 95/00* | (2006.01) |
| *B60C 1/00* | (2006.01) |

(52) U.S. Cl.
USPC .............. 423/449.1; 423/445 R; 423/450; 516/901; 106/311; 106/476; 106/472; 524/59; 524/495

(58) Field of Classification Search
None
See application file for complete search history.

(56) References Cited

U.S. PATENT DOCUMENTS

| | | | |
|---|---|---|---|
| 3,787,562 A | | 1/1974 | Heller |
| 3,867,513 A | | 2/1975 | Krejci |
| 3,922,335 A | | 11/1975 | Jordan et al. |
| 4,221,772 A | * | 9/1980 | Eisenmenger et al. ... 423/445 R |
| 4,444,866 A | | 4/1984 | Sakai et al. |
| 4,846,556 A | | 7/1989 | Haneda |
| 4,880,857 A | | 11/1989 | Mori et al. |
| 4,934,791 A | | 6/1990 | Shimizu et al. |
| 4,940,749 A | | 7/1990 | Mori et al. |
| 4,976,945 A | * | 12/1990 | Kanamaru et al. ............ 423/450 |
| 4,994,520 A | | 2/1991 | Mori et al. |
| 5,093,407 A | | 3/1992 | Komai et al. |
| 5,121,237 A | | 6/1992 | Ikeda et al. |

(Continued)

FOREIGN PATENT DOCUMENTS

| | | |
|---|---|---|
| EP | 0420271 A1 | 4/1991 |
| KR | 10-2005-0070947 | 7/2005 |

(Continued)

OTHER PUBLICATIONS

EP 0 020 889 to Degussa AG (Jan. 7, 1981)—Abstract Only.

(Continued)

*Primary Examiner* — Guinever Gregorio

(57) ABSTRACT

A carbon black having an $I_2$ number from 30 mg/g to 200 mg/g and a DBP from 20 cc/100 g to 40 cc/100 g.

20 Claims, 3 Drawing Sheets

(56) References Cited

U.S. PATENT DOCUMENTS

| | | |
|---|---|---|
| 5,122,891 A | 6/1992 | Kim |
| 5,137,962 A * | 8/1992 | Green .................. 524/496 |
| 5,164,443 A | 11/1992 | Watanabe |
| 5,190,739 A | 3/1993 | MacKay et al. |
| 5,199,984 A | 4/1993 | Jeong |
| 5,214,541 A | 5/1993 | Yamasita et al. |
| 5,214,542 A | 5/1993 | Yamasita et al. |
| 5,229,452 A | 7/1993 | Green |
| 5,251,071 A | 10/1993 | Kusukawa et al. |
| 5,426,147 A * | 6/1995 | Laube et al. .................. 524/495 |
| 5,456,750 A * | 10/1995 | Mackay et al. .............. 106/476 |
| 5,527,649 A | 6/1996 | Sato et al. |
| 5,573,876 A | 11/1996 | Suzuki et al. |
| 5,619,357 A | 4/1997 | Angelopoulos et al. |
| 5,639,579 A | 6/1997 | Hayashi et al. |
| 5,641,595 A | 6/1997 | Hsieh et al. |
| 5,658,697 A | 8/1997 | Lin |
| 5,666,177 A | 9/1997 | Hsieh et al. |
| 5,667,921 A | 9/1997 | Takayanagi et al. |
| 5,683,836 A | 11/1997 | Deboer et al. |
| 5,688,317 A * | 11/1997 | Mackay et al. .............. 106/476 |
| 5,707,432 A | 1/1998 | Adams et al. |
| 5,714,000 A | 2/1998 | Wellen et al. |
| 5,718,746 A | 2/1998 | Nagasawa et al. |
| 5,718,992 A | 2/1998 | Sato et al. |
| 5,747,559 A | 5/1998 | Whitehouse |
| 5,782,968 A | 7/1998 | Hirayama et al. |
| 5,783,339 A | 7/1998 | Watanabe et al. |
| 5,786,042 A | 7/1998 | Inoue et al. |
| 5,803,959 A | 9/1998 | Johnson et al. |
| 5,814,434 A | 9/1998 | Nakamura et al. |
| 5,821,277 A | 10/1998 | Hirayama et al. |
| 5,837,374 A | 11/1998 | Hirayama et al. |
| 5,858,911 A | 1/1999 | Wellen et al. |
| 5,863,678 A | 1/1999 | Urano et al. |
| 5,866,298 A | 2/1999 | Iwamoto et al. |
| 5,871,706 A | 2/1999 | Whitehouse |
| 5,872,177 A | 2/1999 | Whitehouse |
| 5,877,250 A | 3/1999 | Sant |
| 5,877,251 A | 3/1999 | Sant |
| 5,880,799 A | 3/1999 | Inoue et al. |
| 5,885,335 A | 3/1999 | Adams et al. |
| 5,908,720 A | 6/1999 | Uchikawa et al. |
| 5,914,206 A | 6/1999 | Takasaki et al. |
| 5,925,484 A | 7/1999 | Shima et al. |
| 5,942,358 A | 8/1999 | Ihara et al. |
| 5,952,429 A | 9/1999 | Ikeda et al. |
| 5,998,090 A | 12/1999 | Sabnis et al. |
| 6,013,415 A | 1/2000 | Sakurai et al. |
| 6,057,900 A | 5/2000 | Ono et al. |
| 6,087,050 A | 7/2000 | Itano et al. |
| 6,103,432 A | 8/2000 | Kim et al. |
| 6,110,625 A | 8/2000 | Wen et al. |
| 6,114,280 A | 9/2000 | Stephens |
| 6,120,973 A | 9/2000 | Itano et al. |
| 6,132,876 A | 10/2000 | Vogler et al. |
| 6,140,007 A | 10/2000 | Watanabe et al. |
| 6,156,837 A | 12/2000 | Branan, Jr. et al. |
| 6,159,645 A | 12/2000 | Wilpert et al. |
| 6,175,395 B1 | 1/2001 | Yamazaki et al. |
| 6,255,034 B1 | 7/2001 | Shimada et al. |
| 6,342,330 B2 | 1/2002 | Watanabe et al. |
| 6,358,487 B1 | 3/2002 | Omae et al. |
| 6,372,349 B1 | 4/2002 | Hisashi et al. |
| 6,375,735 B1 | 4/2002 | Stephens et al. |
| 6,391,274 B1 | 5/2002 | Vogler et al. |
| 6,413,686 B2 | 7/2002 | Kishimoto et al. |
| 6,417,283 B1 | 7/2002 | Ikeda et al. |
| 6,471,763 B1 | 10/2002 | Karl |
| 6,482,386 B2 | 11/2002 | Atchetee et al. |
| 6,617,093 B2 | 9/2003 | Pokorny et al. |
| 6,638,354 B2 | 10/2003 | Stephens et al. |
| 6,645,287 B2 | 11/2003 | Nguyen |
| 6,653,000 B2 | 11/2003 | Jin bo et al. |
| 6,720,119 B2 | 4/2004 | Ohtsu et al. |
| 6,734,931 B2 | 5/2004 | Yu et al. |
| 6,762,236 B2 | 7/2004 | Freund |
| 6,783,813 B2 | 8/2004 | You et al. |
| 6,786,958 B2 | 9/2004 | Morita et al. |
| 6,827,772 B2 | 12/2004 | Foster |
| 6,852,790 B2 | 2/2005 | Thielen et al. |
| 7,006,177 B2 | 2/2006 | Hirakata et al. |
| 7,112,618 B2 | 9/2006 | Otto et al. |
| 7,141,624 B2 | 11/2006 | Bhatt et al. |
| 7,220,307 B2 | 5/2007 | Kano et al. |
| 7,256,534 B2 | 8/2007 | Koo et al. |
| 7,267,929 B2 | 9/2007 | Takahashi et al. |
| 7,294,372 B2 | 11/2007 | Cok |
| 7,317,577 B2 | 1/2008 | Ali et al. |
| 7,324,278 B2 | 1/2008 | Kuo et al. |
| 7,426,007 B2 | 9/2008 | Kang et al. |
| 2001/0030821 A1 | 10/2001 | Enokido |
| 2003/0063238 A1 | 4/2003 | Yi et al. |
| 2003/0219373 A1 * | 11/2003 | Foster .................. 423/449.1 |
| 2004/0017533 A1 | 1/2004 | Sumino |
| 2004/0157140 A1 | 8/2004 | Kamata et al. |
| 2005/0063893 A1 | 3/2005 | Ayala et al. |
| 2005/0100502 A1 | 5/2005 | Krauss et al. |
| 2005/0127330 A1 | 6/2005 | Hiraoka et al. |
| 2005/0247237 A1 | 11/2005 | Schukat et al. |
| 2005/0249657 A1 | 11/2005 | Kutsovsky |
| 2005/0258406 A1 | 11/2005 | Onishi et al. |
| 2006/0036023 A1 | 2/2006 | Kamata et al. |
| 2006/0041053 A1 | 2/2006 | Kamata et al. |
| 2006/0073398 A1 | 4/2006 | Kang et al. |
| 2006/0077336 A1 | 4/2006 | Hirakata et al. |
| 2006/0084751 A1 | 4/2006 | Step |
| 2006/0125734 A1 | 6/2006 | Cok |
| 2006/0132696 A1 | 6/2006 | Chen et al. |
| 2006/0169171 A1 | 8/2006 | Lee et al. |
| 2006/0204730 A1 | 9/2006 | Nakamura et al. |
| 2006/0264561 A1 * | 11/2006 | Green et al. ................. 524/496 |
| 2006/0284956 A1 | 12/2006 | Chou |
| 2007/0002199 A1 | 1/2007 | Fujikawa et al. |
| 2007/0029920 A1 | 2/2007 | Shiono et al. |
| 2007/0101903 A1 | 5/2007 | Lee et al. |
| 2007/0104636 A1 | 5/2007 | Kutsovsky |

FOREIGN PATENT DOCUMENTS

| | | |
|---|---|---|
| KR | 10-0560713 | 3/2006 |
| WO | WO03/057784 A2 | 7/2003 |
| WO | WO2004046244 | 6/2004 |

OTHER PUBLICATIONS

International Search Report and Written Opinion of the International Searching Authority for PCT/US2008/005201 mailed Oct. 7, 2008.
International Search Report and Written Opinion of the International Searching Authority for PCT/US2008/005202 mailed Oct. 9, 2008.
JP07034001 to Tokai Carbon Co. Ltd. (Feb. 3, 1995)—Abstract only.
JP08262223 to Sumitomo Rubber Ind. Ltd. (Oct. 11, 1996)—Abstract only.
JP09080220 to Mitsubishi Chemical Corp. (Mar. 28, 1997)—Abstract only.
JP09095625 to Mitsubishi Chemical Corp. (Apr. 8, 1997)—Abstract only.
JP10168337 to Tokai Carbon Co. Ltd. (Jun. 23, 1998)—Abstract only.
JP10253820 to Mitsubishi Chemical Corp. (Sep. 25, 1998)—Abstract only.
JP11148026 to Tokai Carbon Co. Ltd. (Jun. 2, 1999)—Abstract only.
JP11158321 to Mikuni Shikiso KK (Jun. 15, 1999)—Abstract only.
JP11181326 to Mitsubishi Chemical Corp. (Jul. 6, 1999)—Abstract only.
JP11256066 to Tokai Carbon Co. Ltd. (Sep. 21, 1999)—Abstract only.
JP11349311 to Mitsubishi Chemical Corp. (Dec. 21, 1999)—Abstract only.
JP11080583 to Mitsubishi Chemical Corp. (Mar. 26, 1999)—Abstract only.

(56) References Cited

OTHER PUBLICATIONS

JP2000248195 to Tokai Carbon Co. Ltd. (Sep. 12, 2000)—Abstract only.
JP2000292615 to Mitsubishi Chemical Corp. (Oct. 20, 2000)—Abstract only.
JP2000313820 to Mitsubishi Chemical Corp. (Nov. 14, 2000)—Abstract only.
JP2001192584 to Mitsubishi Chemical Corp. (Jul. 17, 2001)—Abstract only.
JP2001200178 to Tokai Carbon Co. Ltd. (Jul. 24, 2001)—Abstract only.
JP2001207080 to Mitsubishi Chemical Corp. (Jul. 31, 2001)—Abstract only.
JP2001335720 to Tokai Carbon Co. Ltd. (Dec. 4, 2001)—Abstract only.
JP2001354873 to Mitsubishi Chemical Corp. (Dec. 25, 2001)—Abstract only.
JP2002265816 to Mitsubishi Chemical Corp. (Sep. 18, 2002)—Abstract only.
JP2002069327 to Tokai Carbon Co. Ltd. (Mar. 8, 2002)—Abstract only.
JP2002097390 to Mitsubishi Chemical Corp.; Mikuni Color Ltd. (Apr. 2, 2002)—Abstract only.
JP2003041149 to Tokai Carbon Co. Ltd. (Feb. 13, 2003)—Abstract only.
JP2003064279 to Tokai Carbon Co. Ltd. (Mar. 5, 2003)—Abstract only.
JP2003213035 to Tokai Carbon Co. Ltd. (Jul. 30, 2003)—Abstract only.
JP2003238843 to Tokai Carbon Co. Ltd. (Aug. 27, 2003)—Abstract only.
JP2004107585 to Mitsubishi Chemical Corp. (Apr. 8, 2004)—Abstract only.
JP2004163517 to Tokai Carbon Co. Ltd. (Jun. 10, 2004)—Abstract only.
JP2004168963 to Tokai Carbon Co. Ltd. (Jun. 17, 2004)—Abstract only.
JP2004196846 to Tokai Carbon Co. Ltd. (Jul. 15, 2004)—Abstract only.
JP2004269572 to Mitsubishi Chemical Corp. (Sep. 30, 2004)—Abstract only.
JP2004292672 to Mikuni Color Ltd. (Oct. 21, 2004)—Abstract only.
JP2004053726 to Tokai Carbon Co. Ltd. (Feb. 19, 2004)—Abstract only.
JP2004075985 to Mitsubishi Chemical Corp. (Mar. 11, 2004)—Abstract only.
JP2005189561 to Toyo Ink Mfg. Co. (Jul. 14, 2005)—Abstract only.
JP2005275218 to Toyo Ink Mfg. Co.; Toppan Printing Co. Ltd. (Oct. 6, 2005)—Abstract only.
JP2006003377 to Toyo Ink Mfg.Co.; Toppan Printing Co. Ltd. (Jan. 5, 2006)—Abstract only.
JP2006008820 to Tokai Carbon Co. Ltd. (Jan. 12, 2006)—Abstract only.
KR20000031558 to Korea Carbon Black Co. Ltd. (Jun. 5, 2000)—Abstract only.
KR20040043427 to Korea Engineering Plastic Co. (May 24, 2004)—Abstract only.
KR20060086526 to Gwangju Inst. of Science and Te. (Aug. 1, 2006)—Abstract only.

* cited by examiner

LOW STRUCTURE CARBON BLACK AND METHOD OF MAKING SAME

This application claims priority from U.S. Provisional Applications Nos. 60/926,003, filed Apr. 24, 2007, and 60/963,815, filed Aug. 7, 2007, the contents of both of which are incorporated herein in their entirety.

BACKGROUND OF THE INVENTION

1. Field of the Invention

The present invention relates to low structure carbon blacks and methods of producing them.

2. Description of the Related Art

Carbon blacks are used as pigments in a wide variety of media, including, for example, toners, inkjet inks, and inkjetable color filters. The structure and surface area of these blacks are chosen to permit a particular loading level of carbon black in a matrix and to reduce conductivity and charge accumulation in the media. Increased loading level increases the optical density (OD), a measure of the opacity of a material, of the media but also increases the viscosity of the coating compositions used to produce the media. Decreasing the structure of the component carbon black can decrease viscosity, allowing thinner layers of the media to be deposited without defects, or it can allow more carbon black to be incorporated at a given viscosity, resulting in a higher optical density.

One method of controlling the structure of a furnace carbon black is by adding alkali ions to a furnace while burning a carbonaceous feedstock. For example, in U.S. Pat. No. 5,456,750, increasing the addition of potassium to a carbon black furnace decreased the structure of the resulting black. However, the resulting metal component in the carbon black can contribute to increased conductivity, and non-carbon materials in the media do not contribute to optical density. In addition, while optical density or tint may be increased by increasing surface area, it becomes increasingly difficult to decrease the structure as the surface area is increased. For example, in the '750 patent, those carbon blacks having the lowest DBP (dibutyl phthalate absorption) also had relatively lower tint than carbon blacks with DBP greater than 40. The lower tint means that greater concentrations of the carbon black in a particular media would have been required to obtain a desired optical density, increasing the cost of the media and increasing manufacturing difficulty, since higher concentrations of carbon black are often more difficult to disperse. Furthermore, as potassium and other metal elements are added to the furnace, the resulting black has more charged groups on the surface and is thus more acidic and hydrophilic. More hydrophilic or acidic blacks (e.g., pH less than 6) may not be compatible with as wide a range of polymers and other components that would be otherwise desirable for use in coating or printing applications. Thus, it is desirable to identify a method of producing carbon blacks having low structure but also having low amounts of alkali metals and low acidity and hydrophilicity and that do not compromise optical density and viscosity in coating, toner, or ink compositions incorporating the carbon black.

SUMMARY OF THE INVENTION

In one aspect, the invention includes a carbon black having an iodine number ($I_2$ number) from 30 to 200 mg/g, a DBP from 20 cc/100 g to 40 cc/100 g, and a total concentration of Group IA and IIA elements, in μg/g, of at most y+(15*$I_2$ number), wherein y is 250, 100, −50, −150, or −350. For example, the carbon black may have a DBP of from 20 to 40 cc/100 g, from 20 to 30 cc/100 g, from 30 to 39 cc/100 g, or a DBP in any range bounded by any of these endpoints. Alternatively or in addition, the carbon black may have an iodine number of from 30 to 200 mg/g, from 30 to 45 mg/g, from 45 to 100 mg/g, from 70 to 100 mg/g, from 100 to 150 mg/g, from 150 to 200 mg/g, 70 to 200 mg/g, or in any range bounded by any of these endpoints. The carbon black may be characterized by at least one of the following: an M-ratio from 1 to less than 1.25; a pH from 6 to 10; a water spreading pressure of at most 6 mJ/m$^2$; or a tint obeying the equation tint=x+0.44*$I_2$ number, where x is from 45 to 90, for example, from 60 to 90 or from 75 to 90. The carbon black may be an oxidized carbon black, a heat treated carbon black, or a modified carbon black comprising an attached organic group.

In another aspect, the invention includes a carbon black having an $I_2$ number from 30 to 200 mg/g, a DBP from 20 cc/100 g to 40 cc/100 g, and an M-ratio from 1.00 to less than 1.25. For example, the carbon black may have a DBP of from 20 to 40 cc/100 g, from 20 to 30 cc/100 g, from 30 to 39 cc/100 g, or a DBP in any range bounded by any of these endpoints. Alternatively or in addition, the carbon black may have an iodine number of from 30 to 200 mg/g, from 30 to 45 mg/g, from 45 to 100 mg/g, from 70 to 100 mg/g, from 100 to 150 mg/g, from 150 to 200 mg/g, 70 to 200 mg/g, or in any range bounded by any of these endpoints. The carbon black may be characterized by at least one of the following: a pH from 6 to 10; a total concentration of Group IA and IIA elements, in μg/g, of at most y+(15*$I_2$ number), wherein y is 250, 100, −50, −150, or −350; a water spreading pressure of at most 6 mJ/m$^2$; or a tint obeying the equation tint=x+0.44*$I_2$ number, where x is from 45 to 90, for example, from 60 to 90 or from 75 to 90. The carbon black may be an oxidized carbon black, a heat treated carbon black, or a modified carbon black comprising an attached organic group.

In another aspect, the invention includes a carbon black having an $I_2$ number from 30 to 200 mg/g, a DBP from 20 cc/100 g to 40 cc/100 g, a water spreading pressure of at most 6 mJ/m$^2$, and an M-ratio from 1.00 to less than 1.25. For example, the carbon black may have a DBP of from 20 to 40 cc/100 g, from 20 to 30 cc/100 g, from 30 to 39 cc/100 g, or a DBP in any range bounded by any of these endpoints. Alternatively or in addition, the carbon black may have an iodine number of from 30 to 200 mg/g, from 30 to 45 mg/g, from 45 to 100 mg/g, from 70 to 100 mg/g, from 100 to 150 mg/g, from 150 to 200 mg/g, 70 to 200 mg/g, or in any range bounded by any of these endpoints. The carbon black may be characterized by at least one of the following: a pH from 6 to 10; a total concentration of Group IA and IIA elements, in μg/g, of at most y+(15*$I_2$ number), wherein y is 250, 100, −50, −150, or −350; or a tint obeying the equation tint=x+0.44*$I_2$ number, where x is from 45 to 90, for example, from 60 to 90 or from 75 to 90. The carbon black may be an oxidized carbon black, a heat treated carbon black, or a modified carbon black comprising an attached organic group.

In another aspect, the invention includes a carbon black having an $I_2$ number from 70 to 200 mg/g, a DBP from 20 cc/100 g to 50 cc/100 g, and a water spreading pressure of at most 6 mJ/m$^2$. For example, the carbon black may have a DBP value of from 20 to 40 cc/100 g, from 20 to 50 cc/100 g, 20 to 45 cc/100 g, from 20 to 30 cc/100 g, from 30 to 39 cc/100 g, from 30 to 45 cc/100 g, from 40 to 45 cc/100 g, from 45 to 50 cc/100 g, or a DBP in any range bounded by any of these endpoints. Alternatively or in addition, the carbon black may have an iodine number of from 70 to 100 mg/g, from 100 to 150 mg/g, from 150 to 200 mg/g, 70 to 200 mg/g, or in any range bounded by any of these endpoints. The carbon black may be characterized by at least one of the following: an M-ratio from 1 to less than 1.25; a pH from 6 to 10; a total concentration of Group IA and IIA elements, in µg/g, of at most $y+(15*I_2$ number), wherein y is 250, 100, −50, −150, or −350; or a tint obeying the equation tint=$x+0.44*I_2$ number, where x is from 45 to 90, for example, from 60 to 90 or from 75 to 90. The carbon black may be an oxidized carbon black, a heat treated carbon black, or a modified carbon black comprising an attached organic group.

In another aspect, the invention includes a process for producing a carbon black product having an iodine number from 30 mg/g to 200 mg/g and a DBP from 20 cc/100 g to 40 cc/100 g. For example, the carbon black may have a DBP of from 20 to 40 cc/100 g, from 20 to 30 cc/100 g, from 30 to 39 cc/100 g, or a DBP in any range bounded by any of these endpoints. Alternatively or in addition, the carbon black may have an iodine number of from 30 to 200 mg/g, from 30 to 45 mg/g, from 45 to 100 mg/g, from 70 to 100 mg/g, from 100 to 150 mg/g, from 150 to 200 mg/g, 70 to 200 mg/g, or in any range bounded by any of these endpoints. The method includes forming a stream of combustion gases by reacting a preheated air stream with a fuel, introducing feedstock into the stream of combustion gases at a predetermined number of points in an axial plane to form an effluent and start pyrolysis of the feedstock in the effluent, introducing an auxiliary hydrocarbon into the stream of combustion gases at the predetermined number of points in an axial plane, wherein the points of injection of the feedstock and the auxiliary hydrocarbon alternate in the axial plane, additionally introducing into the stream of combustion gases at least one substance containing at least one Group IA or Group IIA element or a combination thereof, and quenching the pyrolysis using water that has been subjected to reverse osmosis treatment, wherein the total of Group IA and IIA elements, in µg/g, in the carbon black product is at most $y+15*I_2$ number, wherein y is 250, 100, −50, −150, or −350. The overall combustion ratio may be greater than 26%. The predetermined number may be three. The auxiliary hydrocarbon may hydrocarbonaceous and may be introduced in an amount such that the carbon content of the auxiliary hydrocarbon is at most about 20% by weight of the total carbon content of all fuel streams injected into the reactor. The auxiliary hydrocarbon may be in gaseous form. The carbon black may be characterized by at least one of the following: an M-ratio from 1 to less than 1.25; a pH from 6 to 10; a water spreading pressure of at most 6 mJ/m$^2$; or a tint obeying the equation tint=$x+0.44*I_2$ number, where x is from 45 to 90, for example, from 60 to 90 or from 75 to 90. The process may further include modifying a surface chemistry or a microstructure of the carbon black. The process may further include modifying the carbon black to attach an organic group, oxidizing the carbon black, or heat treating the carbon black.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

Figure 1:
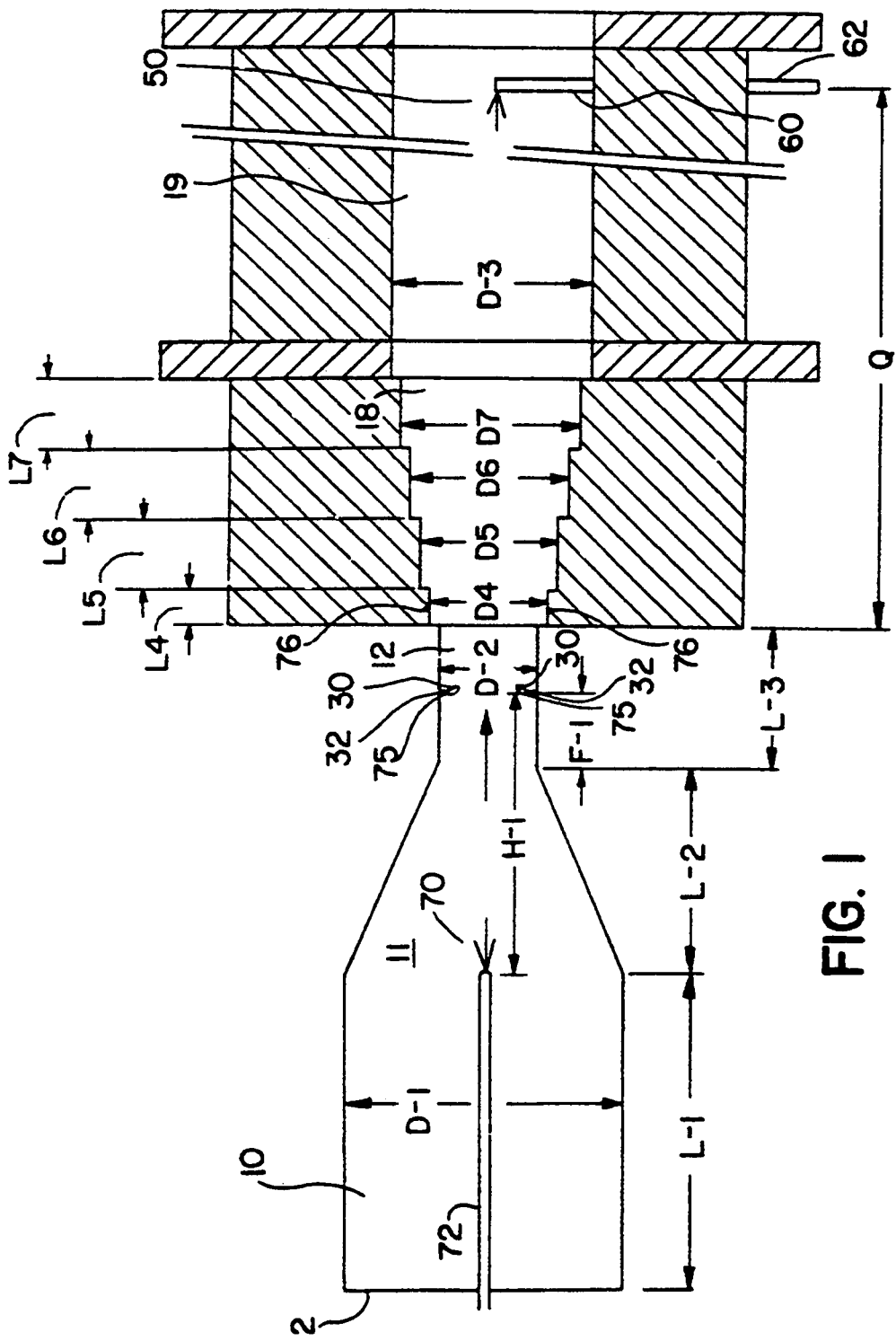
FIG. 1 is a cross-sectional view of a portion of one type of furnace carbon black reactor that may be utilized to produce carbon blacks for use in exemplary embodiments of the invention.

We have found that carbon blacks with low structure, e.g., a DBP of 20 cc/100 g to 40 or 50 cc/100 g, can be obtained at intermediate to high surface area, e.g., an iodine number of 30 mg/g or 70 mg/g to 200 mg/g, by a combination of adding alkali and/or alkaline earth salts to the feedstock of a carbon black furnace operated under particular conditions, for example, with addition of auxiliary hydrocarbon and an increased overall combustion ratio, as described in more detail below. The resulting carbon black has neutral to moderately basic pH and is also more hydrophobic than would have been expected from the reaction conditions employed. The levels of structure are significantly lower than what could be achieved through the use of alkali or alkaline earth addition or auxiliary hydrocarbon alone. Furthermore, the amount of alkali or alkaline earth metals in the carbon black is lower than what is usually found for lower structure carbon blacks with intermediate to high surface area, e.g., iodine number of 30 to 200 m$^2$/g. Despite the low structure, the carbon blacks have relatively high tint. In addition, the carbon blacks exhibit a lower M-ratio than prior art blacks having similar surface areas or structures.

In one embodiment, a carbon black has a DBP from 20 cc/100 g to 40 cc/100 g and an $I_2$ number from 30 to 200 mg/g. For example, the carbon black may have a DBP of from 20 to 40 cc/100 g, from 20 to 30 cc/100 g, from 30 to 39 cc/100 g, or a DBP in any range bounded by any of these endpoints. Alternatively or in addition, the carbon black may have an iodine number of from 30 to 200 mg/g, from 30 to 45 mg/g, from 45 to 100 mg/g, from 70 to 100 mg/g, from 100 to 150 mg/g, from 150 to 200 mg/g, 70 to 200 mg/g, or in any range bounded by any of these endpoints. As known to those skilled in the art, at fixed porosity, increased surface area correlates with smaller primary particle size.

In an alternative embodiment, the carbon black may have a DBP less than 50 cc/100 g and an iodine number of from 70 to 200 mg/g. For example, the carbon black may have a DBP value of from 20 to 40 cc/100 g, from 20 to 50 cc/100 g, 20 to 45 cc/100 g, from 20 to 30 cc/100 g, from 30 to 39 cc/100 g, from 30 to 45 cc/100 g, from 40 to 45 cc/100 g, from 45 to 50 cc/100 g, or a DBP in any range bounded by any of these endpoints. Alternatively or in addition, the carbon black may have an iodine number of from 70 to 100 mg/g, from 100 to 150 mg/g, from 150 to 200 mg/g, 70 to 200 mg/g, or in any range bounded by any of these endpoints.

In any of the embodiments described herein, the carbon black primary particles may approach an essentially overall spherical geometry.

The carbon black may additionally have one or more of the following properties, each of which is discussed in more detail below. The total concentration of alkali and alkaline earth elements (e.g., Group IA and IIA elements) in µg/g, may be at most ($y+15*I_2$ number), where y is 250, 100, −50, −150, or −350. The M-ratio, the ratio of the median Stokes diameter to the mode of the Stokes diameter of a carbon black sample, may be from 1.0 to less than 1.25, for example, between 1.22 and 1.24 or in any range defined by any of these endpoints. The tint of the carbon black may be defined by the following equation:

$$Tint = x + 0.44 * I_2 \text{ number}$$

where x may be from 45 to 90, for example, from 60 to 90 or from 75 to 90. The carbon black may have a pH from 6 to 10, for example, from 6 to 8, from 8 to 10, from 7 to 9, or in any range defined by any of these endpoints. The water spreading pressure (WSP), a measure of the interaction energy between the carbon black surface and water vapor, may be at most 6 mJ/m$^2$, for example, at most 5 mJ/m$^2$, at most 4 mJ/m$^2$, from 2 to 6 mJ/m$^2$, from 2 to 5 mJ/m$^2$ from 3 to 6 mJ/m$^2$, from 3 to 5 mJ/m$^2$, or in any range defined by any of the endpoints herein.

We have identified operating conditions that permit low structure carbon blacks to be produced with high surface areas but with lower amounts of Group IA and Group IIA metal elements than have been previously used, thereby reducing the amount of these metals in the carbon black product. In general, for a carbon black having a given surface area, the structure can only be depressed to a certain amount by addition of metal elements, after which additional metal element addition does not further influence structure. However, we have produced carbon blacks having significantly lower structure, e.g., a dibutylphthalate absorption (DBP) value of 20 cc/100 g to 40 cc/100 g or 20 cc/100 g to 50 cc/100 g, than has been previously achievable for intermediate surface area blacks, not to mention high surface area blacks. Exemplary apparatus and reaction conditions are described below and in the Examples. Carbon blacks according to various embodiments of the invention may also be produced using a variety of other apparatus, including those described in, for example, U.S. Pat. Nos. 5,456,750, 4,391,789; 4,636,375; 6,096,284; and 5,262,146. One of skill in the art will recognize how to adapt the reaction conditions described below to produce carbon blacks according to the various embodiments of the invention in other apparatus.

In one embodiment, carbon blacks are produced in a modular furnace carbon black reactor 2, such as that depicted in FIG. 1, having a combustion zone 10, which has a zone of converging diameter 11, transition zone 12, entry section 18, and reaction zone 19. The diameter of the combustion zone 10, up to the point where the zone of converging diameter 11 begins, is shown as D-1; the diameter of zone 12, as D-2; the diameters of the stepped entry section, 18, as D-4, D-5, D-6, and D-7; and the diameter of zone 19, as D-3. The length of the combustion zone 10, up to the point where the zone of converging diameter 11 begins, is shown as L-1; the length of the zone of converging diameter is shown as L-2; the length of the transition zone is shown as L-3; and the lengths of the steps in the reactor entry section, 18, as L-4, L-5, L-6 and L-7.

To produce carbon blacks, hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone 10 to generate the hot combustion gases are any of the readily combustible gas, vapor, or liquid streams such as natural gas, hydrogen, carbon monoxide, methane, acetylene, alcohol, or kerosene. It is generally preferred, however, to utilize fuels having a high content of carbon-containing components and in particular, hydrocarbons. The volumetric ratio of air to natural gas utilized to produce the carbon blacks of the present invention may preferably be from about 10:1 to about 100:1. To facilitate the generation of hot combustion gases, the oxidant stream may be preheated. In some embodiments, the overall combustion ratio is at least 26%, for example, from 26% to 35%, from 28% to 35%, from 30% to 35%, at least 28%, or at least 30%.

The hot combustion gas stream flows downstream from zones 10 and 11 into zones 12, 18, and 19. The direction of the flow of hot combustion gases is shown in the figure by the arrow. Carbon black-yielding feedstock 30 is introduced at point 32 (located in zone 12), and/or at point 70 (located in zone 11). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

The distance from the end of the zone of converging diameter 11 to point 32 is shown as F-1. Generally, carbon black-yielding feedstock 30 is injected in the form of a plurality of streams which penetrate into the interior regions of the hot combustion gas stream to insure a high rate of mixing and shearing of the carbon black-yielding feedstock by the hot combustion gases so as to rapidly and completely decompose and convert the feedstock to carbon black.

Auxiliary hydrocarbon is introduced at point 70 through probe 72 or through auxiliary hydrocarbon passages 75 in the walls which form the boundaries of zone 12 of the carbon black forming process or through auxiliary hydrocarbon passages 76 in the walls which form the boundaries of zones 18 and/or 19 of the carbon black forming process. The term "auxiliary hydrocarbon" as used herein refers to hydrogen or any hydrocarbon having a molar hydrogen-to-carbon ratio greater than the molar hydrogen-to-carbon ratio of the feedstock and may be gaseous or liquid. Exemplary hydrocarbons include but are not limited to those materials described herein as suitable for use as fuels and/or feedstocks. In certain embodiments of the invention, the auxiliary hydrocarbon is natural gas. The auxiliary hydrocarbon may be introduced at any location between the point immediately after the initial combustion reaction of the first-stage fuel and the point immediately before the end of formation of carbon black provided that unreacted auxiliary hydrocarbon eventually enters the reaction zone. In certain preferred embodiments, the auxiliary hydrocarbon is introduced in the same axial plane as the feedstock. In the Examples described below, the auxiliary hydrocarbon was introduced through three orifices in the same axial plane as the carbon black yielding feedstock streams. The orifices are preferably arranged in an alternating pattern, one feedstock, the next auxiliary hydrocarbon, etc., spaced evenly around the outer periphery of section 12. The quantity of auxiliary hydrocarbon added to the reactor may be adjusted so that carbon content of the auxiliary hydrocarbon is at most about 20% by weight of the total carbon content of all fuel streams injected into the reactor, for example, from about 1 to about 5%, from about 5% to about 10%, from about 10% to about 15%, from about 15% to about 20%, or in any range bounded by any of these endpoints. In certain preferred embodiments, the carbon content of the auxiliary hydrocarbon is from about 3% to about 6% by weight of the total carbon content of all fuel streams injected into the reactor.

The distance from point 32 to point 70 is shown as H-1.

In some embodiments, specific alkali or alkaline earth materials are added to the carbon black as a structure modifier in such an amount that the total concentration in the resulting carbon black of alkali or alkaline earth materials is low. Preferably, the substance contains at least one alkali metal or alkaline earth metal. In certain exemplary embodiments, potassium ion is added to the feedstock and eventually incorporated into the carbon black, while the total Group IA and IIA element concentration remains low. Other examples of Group IA and IIA elements that may be exploited for use in various embodiments include lithium, sodium, potassium, rubidium, cesium, francium, calcium, barium, strontium, or radium, or any combination of two or more of these. The substance can be a solid, solution, dispersion, gas, or any combination thereof. More than one substance having the same or different Group IA or Group IIA element can be used. If multiple substances are used, the substances can be added together, separately, sequentially, or in different reaction locations. For purposes of the present invention, the substance can be the metal (or metal ion) itself, a compound containing one or more of these elements, including a salt containing one or more of these elements, and the like. Exemplary salts include both organic and inorganic salts, for example, salts, e.g., of sodium and/or potassium, with any of chloride, acetate, or formate, or combinations of two or more such salts. Preferably, the substance is capable of introducing a metal or metal ion into the reaction that is ongoing to form the carbon black product. For instance, the substance can be added at any point prior to the complete quenching, including prior to the introduction of the carbon black yielding feedstock in the first stage; during the introduction of the carbon black yielding feedstock in the first stage; after the introduction of the carbon black yielding feedstock in the first stage; prior to, during, or immediately after the introduction of the auxiliary hydrocarbon; or any step prior to complete quenching. More than one point of introduction of the substance can be used. The amount of the metal-containing substance can be any amount as long as a carbon black product can be formed. As described above, the amount of the substance can be added in an amount such that the total amount of Group IA and/or Group IIA elements (i.e., the total concentration of Group IA and Group IIA elements contained the carbon black) in µg/g is at most $$y + 15 * I_2 \text{ number}$$

where y may be 250, 100, −50, −200, or −350. In certain embodiments, the substance introduces a Group IA element; for example, the substance may introduce potassium or potassium ion. The substance can be added in any fashion including any conventional means. In other words, the substance can be added in the same manner that a carbon black yielding feedstock is introduced. The substance can be added as a gas, liquid, or solid, or any combination thereof. The substance can be added at one point or several points and can be added as a single stream or a plurality of streams. The substance can be mixed in with the feedstock, fuel, and/or oxidant prior to and/or during their introduction.

In certain embodiments, the substance containing at least one Group IA or Group IIA element is introduced into the feedstock by incorporation of a salt solution into the feedstock. In certain preferred embodiments, salt solutions are mixed with the feedstock such that the concentration of all alkali metal and/or alkaline metal ions is from about 0 to about 1 weight percent. Upon combustion, the metal ions can become incorporated into the carbon black.

The mixture of carbon black-yielding feedstock and hot combustion gases flows downstream through zone 12 into zone 18 and then into zone 19. Quench 60, located at point 62, injecting quenching fluid 50, which may be water, is utilized to stop the chemical reaction when carbon blacks are formed. Point 62 may be determined in any manner known to the art for selecting the position of a quench to stop pyrolysis. One method for determining the position of the quench to stop pyrolysis is by determining the point at which an acceptable Spectronic 20 value for the carbon black is reached. Q is the distance from the beginning of zone 18 to quench point 62, and will vary according to the position of quench 60. In some embodiments, reverse osmosis water is used as the quenching fluid to minimize the amount of additional metal and other elements that are added to the carbon black during quenching.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

In certain embodiments, the carbon blacks may be modified to attach an organic group to the surface, oxidized, or subjected to heat treatment. Carbon black may be heat treated in an inert atmosphere to increase the graphite content of the carbon black. One of skill in the art will recognize that the time and temperature of the heat treatment may be adjusted to achieve a desired amount of graphitization.

Oxidized carbon blacks are oxidized using an oxidizing agent in order to introduce polar, ionic, and/or ionizable groups onto the surface. Carbon blacks prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, carbon blacks prepared using other surface modification methods to introduce ionic or ionizable groups onto a pigment surface, such as chlorination and sulfonylation, may also be used.

Modified carbon blacks may be prepared using any method known to those skilled in the art such that organic chemical groups are attached to the carbon black. For example, the modified carbon black can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the carbon black compared to dispersant type methods, which use, for example, polymers and/or surfactants. Other methods for preparing the modified carbon black include reacting a carbon black having available functional groups with a reagent comprising the organic group, such as is described in, for example, U.S. Pat. No. 6,723,783, which is incorporated in its entirety by reference herein. Such functional carbon black may be prepared using the methods described in the references incorporated above. In addition, modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, *Polym. Sci.*, 17, 417, 1992, each of which is also incorporated in its entirety by reference herein.

In the furnace, the specific iodine number and DBP of the carbon black are controlled by simultaneously adjusting the burner natural gas rate, feedstock rate, metal salt concentration, and auxiliary hydrocarbon rate and location to achieve the desired properties. The iodine number can be increased by increasing the burner natural gas rate, decreasing the feedstock rate, increasing the metal salt concentration, and/or decreasing the auxiliary hydrocarbon rate. The DBP can be increased by increasing the burner natural gas rate, increasing or decreasing the feedstock rate (depending on other factors), decreasing the metal salt concentration, and/or decreasing the auxiliary hydrocarbon rate. Where the auxiliary hydrocarbon is increased e.g., such that it provides more that 8% or 10% of the total carbon content in the reactor, it may be desirable to reduce the amount of feedstock in the reactor to maintain or increase the surface area of the resulting carbon black. Under these conditions, low structure might also be achieved with lower amounts of alkali or alkaline earth materials. The variables discussed herein also affect other characteristics of the carbon black such as tint, WSP, pH, M-ratio, and residual metal content. The exact levels of each variable required to create carbon black with the desired properties depend on the geometry of the reactor and the method of injection of each species into the reactor. Examples are described in more detail below.

We have unexpectedly found that certain conditions for introducing the auxiliary gas, including a decreased injection orifice diameter, increased feed rate, and injection of the auxiliary gas in the same axial plane as the carbon-black yielding feedstock, in combination with specific concentrations of alkali and/or alkaline earth elements in the feedstock, as well as specific diameters and lengths for the various combustion zones, enabled us to produce carbon blacks having both low structure and high surface area. Furthermore, the carbon blacks have structures that are significantly lower, e.g., 20 cc/100 g to 40 cc/100 g or 50 cc/100 g, than what has been previously achievable for intermediate or high surface area blacks, e.g., 30-200 $m^2/g$ or 70 to 200 $m^2/g$. The amount of alkali or alkaline earth metals in the carbon black is lower than what is usually found for lower structure carbon blacks with intermediate to high surface area. The resulting carbon black has the low DBP that facilitates dispersion and reduces viscosity of media in which the carbon black is incorporated to ease manufacturing without a reduction in surface area, which can decrease optical density in devices produced from the carbon black. Furthermore, the low level of alkali and alkaline earth materials further allows low DBP blacks to be employed in electronic applications without sacrificing resistivity. The increased tint exhibited by these carbon blacks decreases the amount of carbon black that must be used in a carrier to achieve a desired optical density.

We have also unexpectedly discovered that use of carbon black having an M-ratio less than 1.25 increases the optical density of materials into which the carbon black is incorporated with respect to carbon blacks having the same structure and surface area but higher M-ratios. This allows lesser quantities of carbon black to be used to obtain a given optical density, reducing the viscosity of millbases and other fluid media containing the carbon black that are used to produce such materials.

Carbon blacks having a neutral pH or slightly basic pH rather than an acidic pH may be more compatible with certain polymers and other materials that can be used to produce coatings, inks, toners, and other media, expanding the range of compositions that may be combined with carbon black for these applications. In addition, such carbon blacks will interact differently with the alkaline developers typically employed in the production of black matrix and resist coatings than acidic carbon blacks and may improve the development characteristics of resists, black matrices, and other coatings employing alkaline developers.

The lower WSP exhibited by these carbon blacks indicates that they are more hydrophobic than carbon blacks having similar surface area or structure but prepared by prior art methods. Carbon blacks with low water spreading pressures, e.g., in the range described above, may be more compatible with certain polymers and other materials that can be used to produce coatings, inks, toners, and other materials, expanding the range of compositions that may be combined with carbon black for these applications. In addition, such carbon blacks will interact differently with the alkaline developers typically employed in the production of black matrix and resist coatings than more hydrophilic carbon blacks and may improve the development characteristics of resists, black matrices, and other coatings employing alkaline developers.

Performance of dispersions, coatings, and devices that include carbon blacks will depend on a variety of factors. We have found that dispersions including a resin and at least one carbon black having a low level of structure, e.g., a DBP of 20 cc/100 g to 40 or 50 cc/100 g, can be produced with higher loadings of carbon black while maintaining Newtonian flow. Furthermore, such dispersions may be used to produce coatings exhibiting improved electrical and optical properties compared to coatings comprising the same resin and more highly structured carbon blacks having the same or similar surface areas.

The ability to increase carbon black loading provides other benefits to materials such as toners, inks, black matrix, photoresist, and millbases used to prepare these and other products. As the carbon black concentration is increased in such media, properties such as curability, developability, patternability, and adhesion to glass are affected. In many cases, one of these properties limits the upper concentration of carbon black that is acceptable in the coating, which in turn imposes an upper limit on the achievable optical density of the film. Exploiting low structure carbon blacks according to certain embodiments of the invention allows the preparation of films with higher loading of carbon black while maintaining high resistivity and film smoothness.

The following testing procedures were used in evaluating the analytical and physical properties of the carbon blacks. Iodine adsorption number of the carbon blacks ($I_2$ No.) was determined according to ASTM Test Procedure D-1510-08. Tinting strength (Tint) of the carbon blacks was determined according to ASTM Test Procedure D3265-07. The DBP (dibutyl phthalate value) of the carbon blacks was determined according to the procedure set forth in ASTM D2414-08. Nitrogen surface area and STSA surface area were measured as per ASTM D6556-07. Ash content was measured as per ASTM D1506-99. The pH was determined by dispersing a known amount of carbon black in water and measuring the pH of the aqueous phase using a pH probe (ASTM D1512-05). Spectronic 20 was measured as per ASTM D1618-99. Na and K content were measured via inductively coupled plasma (ICP) analysis.

Figure 2:
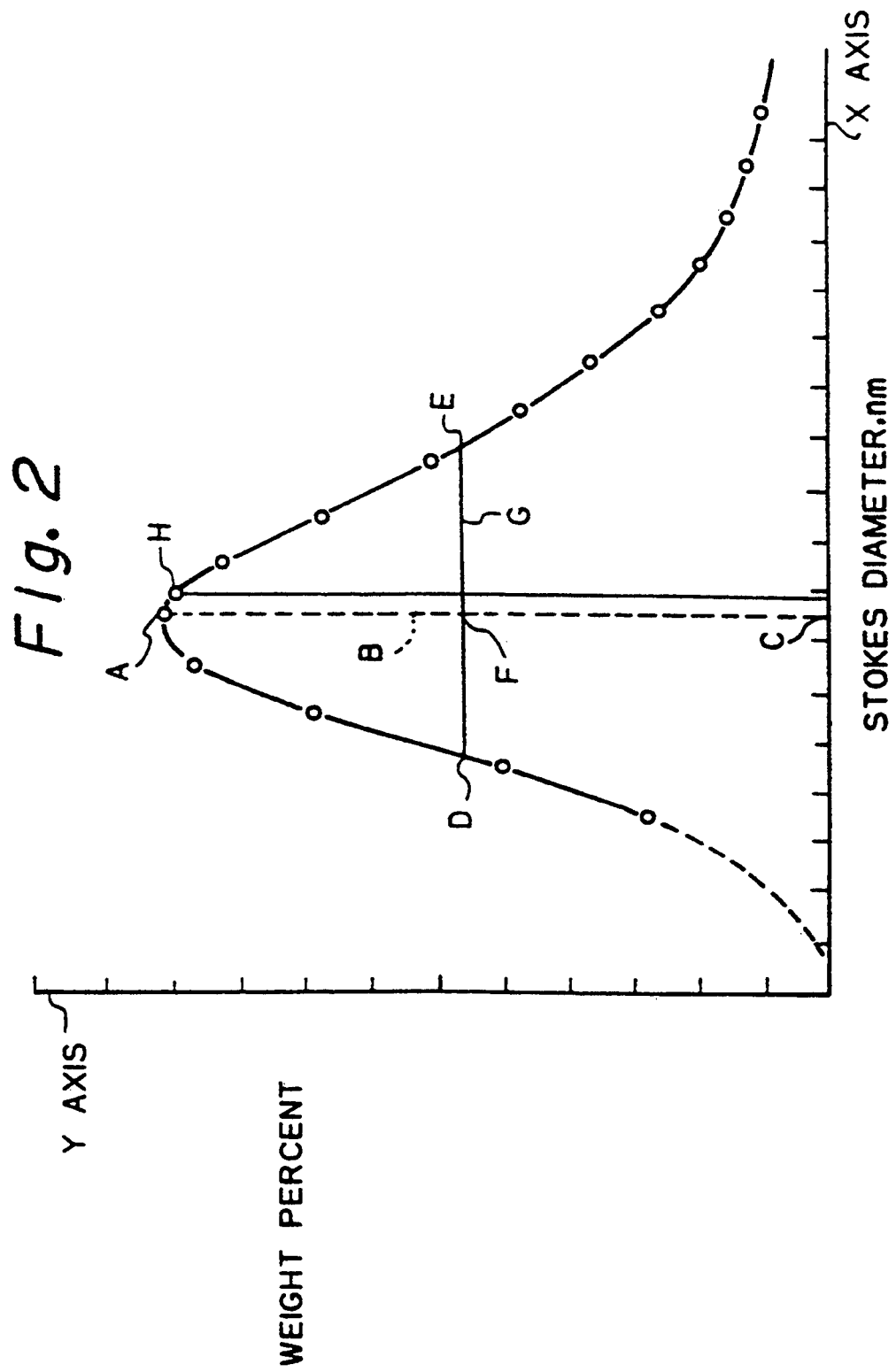
FIG. 2 is a sample histogram of the weight fraction of the aggregates of a carbon black sample versus the Stokes Diameter in a given sample.

The median and mode Stokes diameters were determined from a histogram of the weight fraction of carbon black versus the Stokes diameter of the carbon black aggregates, as shown in FIG. 2 and described in U.S. Pat. No. 5,456,750. Briefly, the data used to generate the histogram are determined by the use of a disk centrifuge such as the one manufactured by Joyce Loebl Co. Ltd. of Tyne and Wear, United Kingdom.

The following procedure is a modification of the procedure described in the instruction manual of the Joyce Loebl disk centrifuge file reference DCF 4.008 published on Feb. 1, 1985, the teachings of which are hereby incorporated by reference, and was used in determining the data. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second. The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units are expressed in nanometer diameters.

Mode (Dmode for reporting purposes)—The Stokes diameter at the point of the peak (Point A of FIG. 2 herein) of the distribution curve for Stokes diameter.

Median Stokes diameter—(Dst for reporting purposes) the point on the distribution curve of Stokes diameter where 50% by weight of the sample is either larger or smaller. It therefore represents the median value of the determination.

The water spreading pressure was measured by observing the mass increase of a sample as it adsorbs water from a controlled atmosphere. In the test, the relative humidity (RH) of the atmosphere around the sample is increased from 0% (pure nitrogen) to ~100% (water-saturated nitrogen). If the sample and atmosphere are always in equilibrium, the water spreading pressure ($\pi_e$) of the sample is defined as:

$$\pi_e = \frac{RT}{A} \int_o^{P_o} \Gamma \, d\ln P$$

where R is the gas constant, T is the temperature, A is the nitrogen surface area of the sample, $\Gamma$ is the amount of adsorbed water on the sample (converted to moles/gm), P is the partial pressure of water in the atmosphere, and $P_o$ is the saturation vapor pressure in the atmosphere. In practice, the equilibrium adsorption of water on the surface is measured at one or (preferably) several discrete partial pressures and the integral is estimated by the area under the curve.

The following procedure may be used to measure the water spreading pressure. Before analysis, 100 mg of the carbon black to be analyzed is dried in an oven at 125° C. for 30 minutes. After ensuring that the incubator in a Surface Measurement Systems DVS1 instrument (supplied by SMS Instruments, Monarch Beach, Calif.) has been stable at 25° C. for 2 hours, sample cups are loaded in both the sample and reference chambers. The target RH is set to 0% for 10 minutes to dry the cups and to establish a stable mass baseline. After discharging static and taring the balance, approximately 8 mg of carbon black is added to the cup in the sample chamber. After sealing the sample chamber, the sample is allowed to equilibrate at 0% RH. After equilibration, the initial mass of the sample is recorded. The relative humidity of the nitrogen atmosphere is then increased sequentially to levels of approximately 5, 10, 20, 30, 40, 50, 60, 70, 78, 87, and 92% RH, with the system allowed to equilibrate for 20 minutes at each RH level. The mass of water adsorbed at each humidity level is recorded, from which water spreading pressure is calculated via the above equation.

The present invention will be further clarified by the following examples which are intended to be only exemplary in nature

EXAMPLES

Example 1

Carbon blacks were prepared in a reactor as described above and shown in FIG. 1 (example C1 is a comparative example), utilizing the reactor conditions and geometry set forth in Table 2. Natural gas was employed as both the fuel for the combustion reaction and the auxiliary hydrocarbon. An aqueous solution of potassium acetate was used as the alkali metal-containing material, and was mixed with the feedstock prior to injection into the reactor. The reaction was quenched with water purified by reverse osmosis. The liquid feedstock had the properties indicated in Table 1, below.

TABLE 1

Feedstock Properties

| | |
|---|---|
| Hydrogen/Carbon Ratio | 0.91 |
| Hydrogen (wt %) | 6.97 |
| Carbon (wt %) | 91.64 |
| Sulfur (wt %) | 0.81 |
| Nitrogen (wt %) | 0.35 |
| Oxygen (wt %) | 0.23 |
| Specific Gravity at 60° F. [ASTM D-287] | 1.1029 |

TABLE 2

Reactor Geometry and Operating Conditions

| | Example No. | | | | | |
|---|---|---|---|---|---|---|
| | A | B | C | D | E | C1 |
| D-1 (m) | 0.18 | 0.18 | 0.18 | 0.18 | 0.18 | 0.18 |
| D-2 (m) | 0.11 | 0.11 | 0.11 | 0.11 | 0.11 | 0.11 |
| D-3 (m) | 0.91 | 0.91 | 0.91 | 0.91 | 0.91 | 0.91 |
| D-4 (m) | 0.91 | 0.91 | 0.91 | 0.91 | 0.91 | 0.91 |
| D-5 (m) | 0.91 | 0.91 | 0.91 | 0.91 | 0.91 | 0.91 |
| D-6 (m) | 0.91 | 0.91 | 0.91 | 0.91 | 0.91 | 0.91 |
| D-7 (m) | 0.91 | 0.91 | 0.91 | 0.91 | 0.91 | 0.91 |
| L-1 (m) | 0.61 | 0.61 | 0.61 | 0.61 | 0.61 | 0.61 |
| L-2 (m) | 0.30 | 0.30 | 0.30 | 0.30 | 0.30 | 0.30 |
| L-3 (m) | 0.23 | 0.23 | 0.23 | 0.23 | 0.23 | 0.23 |
| L-4 (m) | 0 | 0 | 0 | 0 | 0 | 0 |
| L-5 (m) | 0 | 0 | 0 | 0 | 0 | 0 |
| L-6 (m) | 0 | 0 | 0 | 0 | 0 | 0 |
| L-7 (m) | 0 | 0 | 0 | 0 | 0 | 0 |
| Q (m) | 5.0 | 5.0 | 4.0 | 4.0 | 4.0 | 5.0 |
| Combustion Air (nm$^3$/h) | 1600 | 1600 | 1600 | 1600 | 1600 | 1600 |
| Combustion Air Preheat (K) | 753 | 753 | 753 | 753 | 753 | 753 |
| Burner Nat. Gas (nm$^3$/h) | 42 | 42 | 42 | 42 | 42 | 42 |
| Feedstock Injection Orifice Diameter (cm) | 0.198 | 0.208 | 0.150 | 0.170 | 0.170 | 0.170 |
| No. Feedstock Injection Orifices | 3 | 3 | 3 | 3 | 3 | 3 |
| Feedstock Rate ($10^4 \times$ m$^3$/s) | 1.55 | 1.68 | 1.11 | 1.40 | 1.30 | 1.34 |
| Feedstock Temp. (K) | 448 | 443 | 453 | 448 | 468 | 448 |
| K$^+$ Concentration in feedstock (g/m$^3$) | 274 | 236 | 734 | 780 | 485 | 2314 |
| Aux. HC Injection Orifice Diameter (cm) | 0.508 | 0.508 | 0.508 | 0.508 | 0.508 | 0.508 |
| No. Aux. HC Injection Orifices* | 3 | 3 | 3 | 3 | 3 | 3 |
| Aux. HC Rate (nm$^3$/h)** | 30 | 32 | 22 | 27 | 50 | 26 |
| Primary Combustion (%)*** | 400 | 400 | 400 | 400 | 400 | 400 |
| Overall Combustion (%)**** | 25.8 | 23.7 | 34.6 | 28.3 | 28.9 | 29.5 |
| Quench Water Rate (kg/h) | 510 | 510 | 520 | 548 | 580 | 540 |

*The feedstock and auxiliary hydrocarbon orifices were arranged in the same axial plane in an alternating sequence around the periphery of the reactor. HC = hydrocarbon
**nm$^3$ refers to normal cubic meters, where "normal" refers to the gas volume corrected to 0° C. and 1 atm pressure
***Primary combustion is defined as the percentage of oxygen added to the reactor compared to the total amount of oxygen required to stoichiometrically react with the burner natural gas.
****Overall combustion is defined as the percentage of oxygen added to the reactor compared to the total amount of oxygen required to stoichiometrically react with all the fuel streams added to the reactor.

Characterization of Carbon Blacks

Various properties of carbon blacks produced in Example 1 were measured as described elsewhere herein. The pH values shown were determined by dispersing 3 g of the material in 30 mL of water, boiling for 15 minutes, cooling to room temperature, and measuring the pH of the aqueous phase with a pH probe (ASTM D1512-05). Spectronic 20 was measured as per ASTM D1618-99. Na and K content were measured via inductively coupled plasma (ICP) analysis. As shown in Table 3, below, the carbon blacks exhibit low structure, high purity (low extractables and low [K$^+$]), neutral to mildly basic pH, and low WSP (e.g., they are hydrophobic).

TABLE 3

| | Example No. | | | | | |
|---|---|---|---|---|---|---|
| | A | B | C | D | E | C1 |
| Iodine Number (mg/g) | 47 | 33 | 123 | 73 | 69 | 95 |
| DBF (cc/100 g) | 35 | 32 | 37 | 35 | 37 | 34 |
| Nitrogen Surface Area (m$^2$/g) | 42 | | 105 | 62 | 63 | 88 |
| STSA Surface Area (m$^2$/g) | 41 | 31 | 104 | 61 | 63 | 88 |
| Tint (%) | 87 | | 123 | 103 | 105 | 110 |

TABLE 3-continued

| | Example No. | | | | | |
|---|---|---|---|---|---|---|
| | A | B | C | D | E | C1 |
| Spectronic 20 (%) | 99.5 | 75 | | 98 | 98.5 | 100 |
| Boiled pH | 6.6 | | 8.8 | 7.9 | 9.2 | 9.2 |
| D-Mode (nm)* | 84 | | | 69 | 72 | 46 |
| D-Stokes (nm)* | 103 | | | 80 | 86 | 57 |
| Na content (μg/g) | 7.3 | | | | | 24.4 |
| K content (μg/g) | 434.1 | | 1378 | 1221 | 927 | 3916 |
| Ash content (wt %) | 0.19 | | | | | 0.63 |
| WSP (mJ/m$^2$) | 3.0 | | 4.5 | 3.9 | 4.9 | 9.7 |

*Median Stokes diameter

Viscosity

The carbon blacks of Example A and a commercially available carbon black (Comparative Example C2) having the characteristics listed in Table 4, below, were used to prepare millbases with from 10 to 50 wt % carbon black in PGMEA. The millbases also included a dispersant (Solsperse 32500). The ratio between the dispersant and the carbon black was fixed at 0.2. The components were milled using a Skandex lab shaker for 4 hours. The mean volume particle size of the pigments in the millbases were measured and found to be comparable to the aggregate size of base carbon black. Solsperse 32500 is a polymeric dispersant commercially available from Noveon, and PGMEA is propylene glycol methyl ether acetate available from Sigma-Aldrich.

TABLE 4

Comparative Carbon Black Analytical Properties

| | Example No. C2 |
|---|---|
| Iodine Number (mg/g) | 71 |
| DBF (cc/100 g) | 46 |
| Nitrogen Surface Area (m$^2$/g) | 66 |
| STSA Surface Area (m$^2$/g) | 66 |
| Tint (%) | 104 |
| Spectronic 20 (%) | 99 |
| Boiled pH | 7.6 |
| D-Mode (nm) | 77 |
| D-Stokes (nm)* | 87 |
| Na content (μg/g) | 191 |
| K content (μg/g) | 999 |
| Ash content (wt %) | 0.38 |
| WSP (mJ/m$^2$) | 8.0 |

*Median Stokes diameter

Viscosity measurements were conducted for millbase formulations using cuvette geometry and a AR-G2 (TA Instruments) rheometer.

Figure 3:
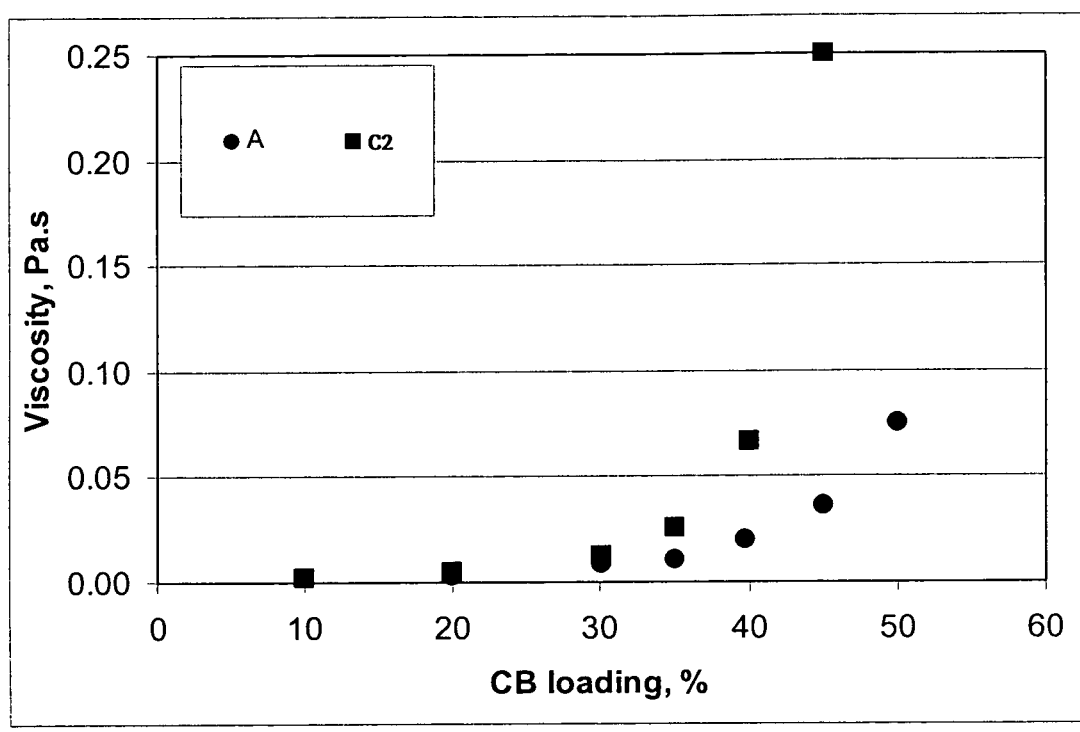
FIG. 3 is a graph showing the viscosity of millbases produced using a carbon black according to an exemplary embodiment of the invention and a commercially available carbon black.

The millbase dispersions were Newtonian fluids. At 50% loading, the dispersion with Carbon Black C2 exhibited non-Newtonian behavior, whereas the dispersion with Carbon Black A was Newtonian in the entire range of carbon black concentrations studied. A key advantage of low DBP carbon black is significantly lower viscosity, especially at higher carbon black loadings (see FIG. 3), which is beneficial for processing (for instance, by spin coating), and film properties (for example, film smoothness resulting from to better leveling off of a lower viscosity coating).

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A carbon black having an $I_2$ number from 30 to 200 mg/g, a DBP from 20 cc/100 g to 40 cc/100 g, an M-ratio of from 1 to 1.23 and a total concentration of Group IA and IIA elements, in μg/g, of at most y+(15*$I_2$ number), wherein y is 250.

2. The carbon black of claim 1, wherein the carbon black is characterized by at least one of the following:
    the carbon black has an M-ratio from 1 to less than 1.22,
    the carbon black has a pH from 6 to 10,
    the carbon black has a water spreading pressure of at most 6 mJ/m$^2$, or
    the carbon black has a tint obeying the equation tint=x+0.44*$I_2$ number, where x is from 45 to 90.

3. The carbon black of claim 1, wherein the carbon black is an oxidized carbon black, a heat treated carbon black, or a modified carbon black comprising an attached organic group.

4. A carbon black having an $I_2$ number from 30 to 200 mg/g, a DBP from 20 cc/100 g to 40 cc/100 g, and an M-ratio from 1.00 to less than 1.23.

5. The carbon black of claim 4, wherein the carbon black is characterized by at least one of the following:
    the carbon black has a pH from 6 to 10,
    the carbon black has a total concentration of Group IA and IIA elements, in μg/g, of at most y+(15*$I_2$ number), wherein y is 250,
    the carbon black has a water spreading pressure of at most 6 mJ/m$^2$, or
    the carbon black has a tint obeying the equation tint=x+0.44*$I_2$ number, where x is from 45 to 90.

6. The carbon black of claim 4, wherein the carbon black is an oxidized carbon black, a heat treated carbon black, or a modified carbon black comprising an attached organic group.

7. A carbon black having an $I_2$ number from 30 to 200 mg/g, a DBP from 20 cc/100 g to 40 cc/100 g, a water spreading pressure of at most 6 mJ/m$^2$, and an M-ratio from 1.00 to less than 1.23.

8. The carbon black of claim 7, wherein the carbon black is characterized by at least one of the following:
    the carbon black has a pH from 6 to 10,
    the carbon black has a total concentration of Group IA and IIA elements, in μg/g, of at most y+(15*$I_2$ number), wherein y is 250, or
    the carbon black has a tint obeying the equation tint=x+0.44*$I_2$ number, where x is from 45 to 90.

9. The carbon black of claim 7, wherein the carbon black is an oxidized carbon black, a heat treated carbon black, or a modified carbon black comprising an attached organic group.

10. A carbon black having an $I_2$ number from 70 to 200 mg/g, a DBP from 20 cc/100 g to 39 cc/100 g, and a water spreading pressure of at most 6 mJ/m$^2$.

11. The carbon black of claim 10, wherein the carbon black is characterized by at least one of the following:
the carbon black has an M-ratio from 1 to less than 1.25,
the carbon black has a pH from 6 to 10,
the carbon black has a total concentration of Group IA and IIA elements, in µg/g, of at most y+(15*$I_2$ number), wherein y is 250, or
the carbon black has a tint obeying the equation tint=x+ 0.44*$I_2$ number, where x is from 45 to 90.

12. The carbon black of claim 10, wherein the carbon black is an oxidized carbon black, a heat treated carbon black, or a modified carbon black comprising an attached organic group.

13. A process for producing a carbon black product having an M-ratio of from 1 to 1.23 and having an iodine number from 30 mg/g to 200 mg/g and a DBP from 20 cc/100 g to 40 cc/100 g, comprising:
forming a stream of combustion gases by reacting a preheated air stream with a fuel;
introducing feedstock into the stream of combustion gases at a predetermined number of points in an axial plane to form an effluent and start pyrolysis of the feedstock in the effluent;
introducing an auxiliary hydrocarbon into the stream of combustion gases at the predetermined number of points in an axial plane, wherein the points of injection of the feedstock and the auxiliary hydrocarbon alternate in the axial plane;
additionally introducing into the stream of combustion gases at least one substance containing at least one Group IA or Group IIA element or a combination thereof; and
quenching the pyrolysis using water that has been subjected to reverse osmosis treatment,
wherein the total of Group IA and IIA elements, in µg/g, in the carbon black product is at most y+15*$I_2$ number, wherein y is 250.

14. The process of claim 13, wherein the overall combustion ratio is at least 26%.

15. The process of claim 13, wherein the predetermined number is three.

16. The process of claim 13, wherein the auxiliary hydrocarbon is hydrocarbonaceous and is introduced in an amount such that the carbon content of the auxiliary hydrocarbon is at most about 20% by weight of the total carbon content of all fuel streams injected into the reactor.

17. The process of claim 13, wherein the auxiliary hydrocarbon is in gaseous form.

18. The process of claim 13, wherein the carbon black is characterized by at least one of the following:
the carbon black has a pH from 6 to 10,
the carbon black has a water spreading pressure of at most 6 mJ/m$^2$, or
the carbon black has a tint obeying the equation tint=x+ 0.44*$I_2$ number, where x is from 45 to 90.

19. The process of claim 13, further comprising modifying a surface chemistry or a microstructure of the carbon black.

20. The process of claim 19, further comprising modifying the carbon black to attach an organic group, oxidizing the carbon black, or heat treating the carbon black.

* * * * *